(12) United States Patent
Chauhan et al.

(10) Patent No.: US 8,737,001 B2
(45) Date of Patent: May 27, 2014

(54) BIT PATTERNED MAGNETIC STORAGE MEDIUM

(75) Inventors: Sundeep Chauhan, Fremont, CA (US); Mehmet Fatih Erden, St. Louis Park, MN (US); Alexei H. Sacks, Minnetonka, MN (US); Qiang Ling, Hefei (CN)

(73) Assignee: Seagate Technology LLC, Cupertino, CA (US)

( * ) Notice: Subject to any disclaimer, the term of this patent is extended or adjusted under 35 U.S.C. 154(b) by 746 days.

(21) Appl. No.: 12/882,773

(22) Filed: Sep. 15, 2010

(65) Prior Publication Data

US 2012/0063027 A1   Mar. 15, 2012

(51) Int. Cl.
G11B 5/09    (2006.01)
G11B 5/596   (2006.01)

(52) U.S. Cl.
USPC .......................................... 360/48; 360/77.08

(58) Field of Classification Search
None
See application file for complete search history.

(56) References Cited

U.S. PATENT DOCUMENTS

| | | | |
|---|---|---|---|
| 5,956,216 A | 9/1999 | Chou | |
| 7,064,914 B1 | 6/2006 | Erden et al. | |
| 7,706,092 B2 | 4/2010 | Ling et al. | |
| 7,948,701 B2 * | 5/2011 | Albrecht et al. | 360/48 |
| 8,300,340 B2 * | 10/2012 | Sakurai et al. | 360/48 |
| 2001/0036030 A1 | 11/2001 | Sacks et al. | |
| 2003/0076612 A1 | 4/2003 | Sacks et al. | |
| 2003/0113524 A1 | 6/2003 | Klemmer et al. | |
| 2005/0157597 A1 | 7/2005 | Sendur et al. | |
| 2005/0271819 A1 | 12/2005 | Wago et al. | |
| 2006/0012913 A1 | 1/2006 | Nakamura et al. | |
| 2007/0217075 A1 | 9/2007 | Kamata et al. | |
| 2008/0002269 A1 | 1/2008 | Sakurai et al. | |
| 2008/0002295 A1 | 1/2008 | Sakurai et al. | |
| 2009/0059412 A1 | 3/2009 | Erden et al. | |
| 2009/0067090 A1 * | 3/2009 | Ling et al. | 360/135 |
| 2009/0153998 A1 * | 6/2009 | Nakamura et al. | 360/39 |
| 2009/0195916 A1 | 8/2009 | Chauhan et al. | |
| 2010/0067145 A1 * | 3/2010 | Pokharel et al. | 360/135 |

FOREIGN PATENT DOCUMENTS

WO    2004010420 A1    1/2004

OTHER PUBLICATIONS

Search Report and Written Opinion from related Singapore Application No. 200806771-2, mailed Apr. 1, 2009.

* cited by examiner

*Primary Examiner* — Andrew L Sniezek
(74) *Attorney, Agent, or Firm* — Braden Katterheinrich

(57) ABSTRACT

A magnetic storage medium comprises a plurality of discrete magnetic elements and first and second adjoining servo sectors. Each of the servo sectors comprises first and second rows of the discrete magnetic elements extending in a track direction. The second row of the discrete magnetic elements are stacked relative to the discrete magnetic elements of the first row in a cross-track direction that is perpendicular to the track direction. The discrete magnetic elements of the first servo sector are staggered in the cross-track direction relative to the discrete magnetic elements of the second servo sector.

13 Claims, 8 Drawing Sheets

BIT PATTERNED MAGNETIC STORAGE MEDIUM

BACKGROUND

The present disclosure relates to data storage devices and, more particularly, but not by limitation, to bit patterned magnetic storage media and magnetic storage devices utilizing the magnetic storage media.

In a conventional magnetic disc drive, data are stored on one or more discs, which are coated with a thin magnetically hard layer. The magnetic layer itself is composed of a single sheet of very fine, single-domain grains. Every information bit of data is stored by many grains. This granular recording medium is typically divided into a plurality of generally parallel data tracks, which are arranged concentrically with one another perpendicular to the disc radius.

To guarantee good signal-to-noise ratio using such conventional magnetic media, the number of grains in every bit should be above a certain level. In order to save more bits on the given disc area (i.e., to increase the areal density), the size of a single grain is decreased. This is called scaling.

It is understood that scaling is limited by the onset of superparamagnetism: if the grain size is too small, the magnetization of the grains can randomly change direction under the influence of thermal energy. At this grain size, information can no longer be stored reliably. Superparamagnetism puts an areal density limit of 0.5 Tb/in$^2$ for perpendicular recording.

This areal density limit could be exceeded through the use of bit patterned media. In a patterned medium recording, ordered arrays of discrete magnetic elements are used to store data. The magnetic elements are separated from each other by a non-magnetic material. Each of the discrete magnetic elements, or islands, is a single grain and stores one information bit.

Unlike the conventional magnetic media, which requires the alignment of many adjoining magnetic grains that must each be magnetized into the same polarity (either positive or negative) to define a bit of data, the adjacent magnetic elements of the bit patterned magnetic storage media can have the same or different magnetic polarities due to their separation from each other by the non-magnetic material. This difference should allow bit patterned media to have a much higher areal density than the conventional magnetic recording media.

The precise placement of the head relative to tracks of the media is advantageous in using high areal density recordings having bit patterned media. Unfortunately, conventional null patterns used by servo systems for controlling the head position relative to tracks of the granular magnetic medium are incompatible with bit patterned magnetic storage media.

Aspects of the present embodiments provide solutions to these and other problems.

SUMMARY

Exemplary embodiments are directed to a bit pattern magnetic storage medium. In one embodiment, the magnetic storage medium comprises first and second adjoining servo sectors. Each of the first and second servo sectors comprise first and second rows of the discrete magnetic elements extending in a track direction. The second row of the discrete magnetic elements have positions along the track direction that substantially aligned with corresponding positions of the discrete magnetic elements of the first row. The discrete magnetic elements of the first servo sector have positions along the track direction that are offset with corresponding positions of the discrete magnetic elements of the second servo sector.

These and various other features will be apparent upon reading of the following detailed description and review of the associated drawings.

DETAILED DESCRIPTION OF ILLUSTRATIVE EMBODIMENTS

Figure 1:
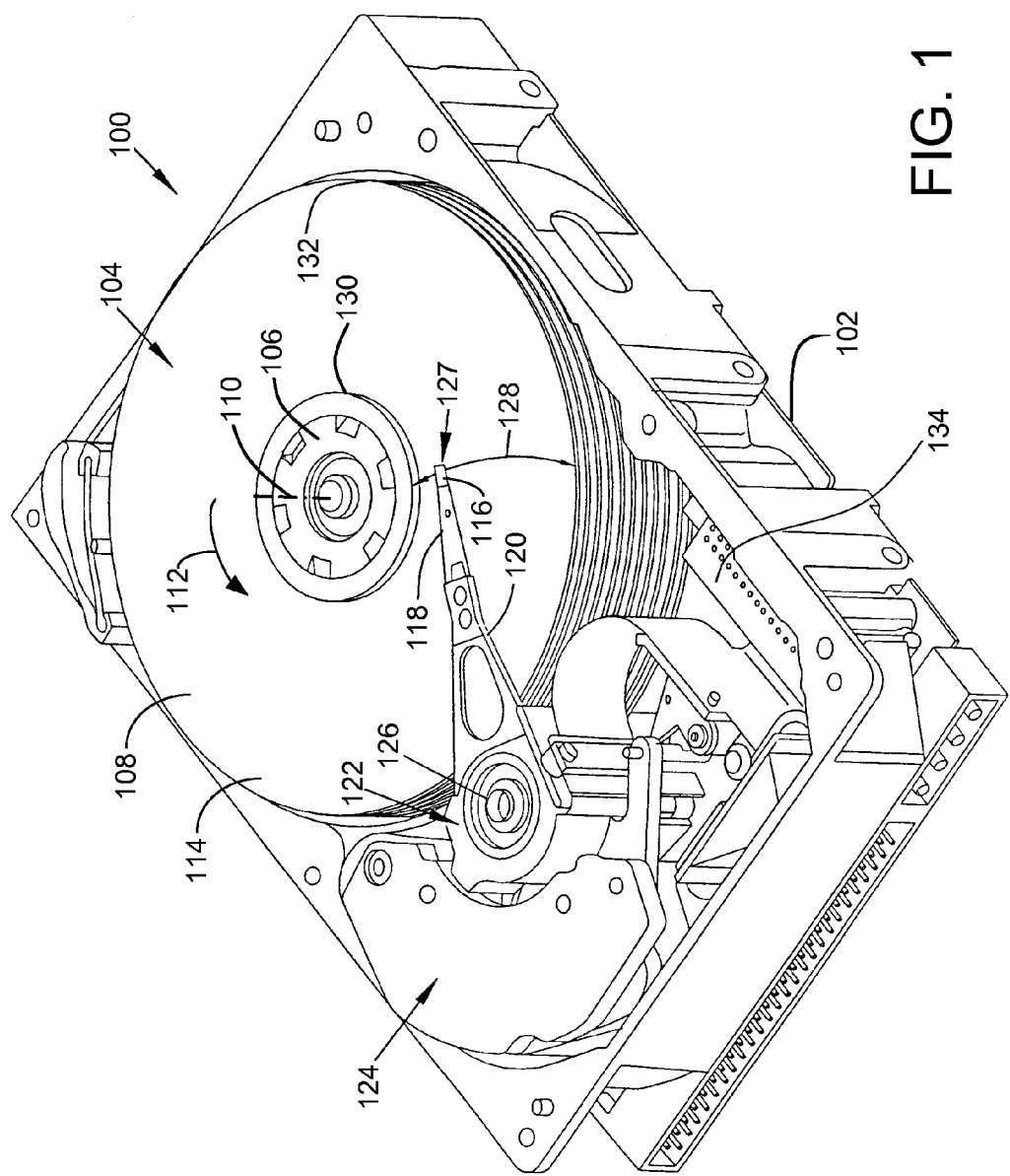
FIG. 1 is an isometric view of an exemplary data storage device in accordance with one or more embodiments of the invention.

FIG. 1 is an isometric view of an exemplary disc drive 100 in accordance with one or more embodiments of the invention. Disc drive 100 includes a housing with a base 102 and a top cover (not shown). Disc drive 100 further includes a disc pack 104, which is rotatably mounted to the base 102. In one embodiment, the disc pack 104 is mounted on a spindle motor (not shown) by a disc clamp 106. The disc pack 104 includes a plurality of individual discs 108, which are mounted for co-rotation about central (spin) axis 110 in a direction 112. In one embodiment, one or more of the discs 108 comprise a bit patterned recording surface 114 and form a magnetic storage medium, which will be described below in greater detail Each disc 108 has an associated disc head slider 116 which is mounted to the disc drive 100 for communication with the patterned recording surface 114. In the example shown in FIG. 1, the sliders 116 are supported by suspensions 118 which are in turn attached to track accessing arms 120 of an actuator 122. The actuator shown in FIG. 1 is of the type known as a rotary moving coil actuator and includes a voice coil motor (VCM), shown generally at 124. The voice coil motor 124 rotates the actuator 122 with its attached heads 116 about a pivot shaft 126 to position the slider 116 and its corresponding read and/or write transducing heads (i.e., transducers) 127 over a desired data track of the surface 114 along an arcuate path 128 between a disc inner diameter 130 and a disc outer diameter 132. The voice coil motor 124 is driven by a servo system 134 based on readback signals generated by the transducing head and an embedded controller in the disc drive.

Figure 2:
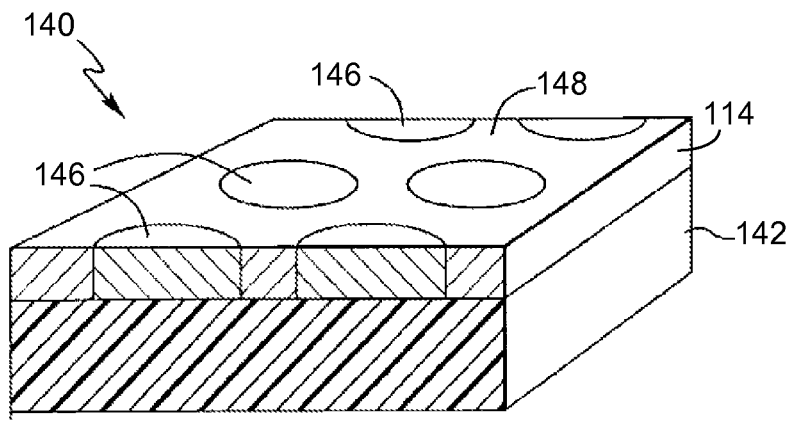
FIG. 2 is a partial cross-sectional perspective view of a bit patterned magnetic recording medium in accordance with one or more embodiments of the invention.
Figure 3:
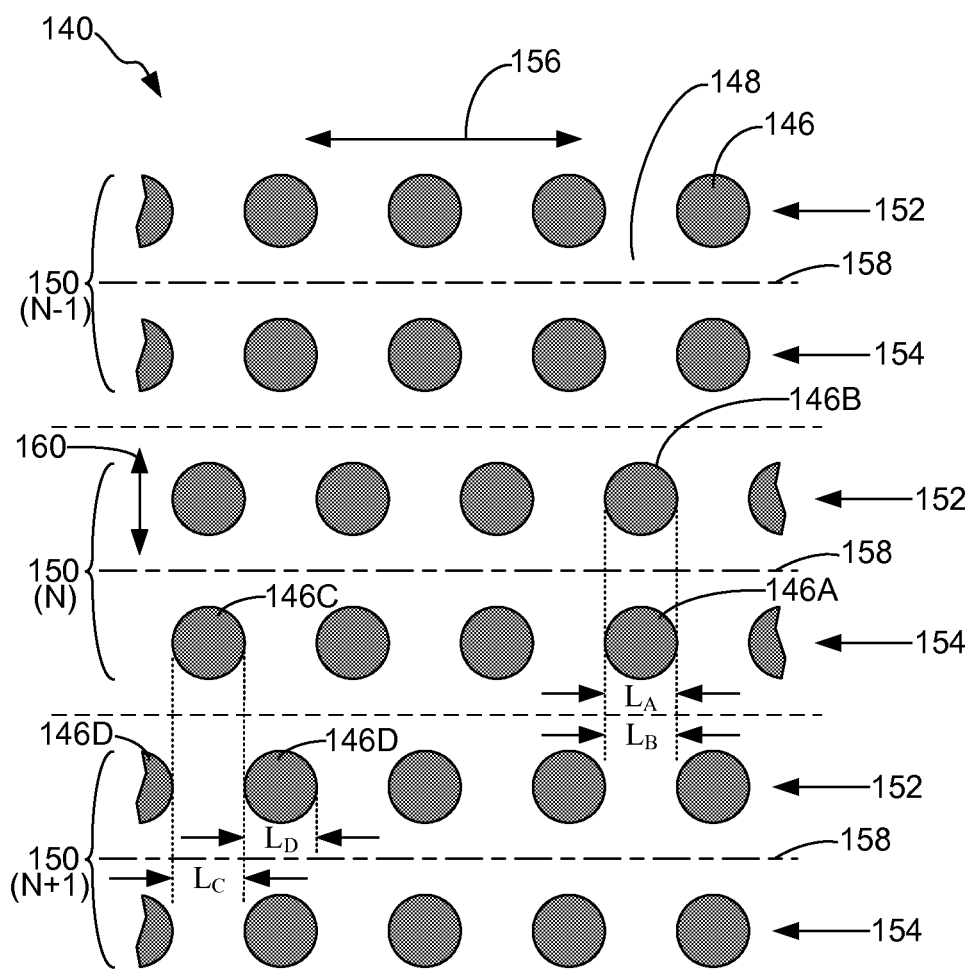
FIG. 3 is a partial top view of data tracks of a magnetic recording medium in accordance with one or more embodiments of the invention.

FIG. 2 illustrates a simplified sectional isometric view and FIG. 3 is a simplified top plan view of a portion of an exemplary patterned magnetic recording (or storage) medium 140 in accordance with one or more embodiments of the invention. One embodiment of the magnetic storage medium 140 comprises a substrate 142 on which the patterned recording surface, layer or film 114 is applied.

One embodiment of the magnetic recording medium 140 comprises an ordered array of patterned discrete magnetic elements or islands 146 in the recording layer 114. In an exemplary embodiment, the term "discrete magnetic elements" means that each of the magnetic elements 146 are separated from each other by non-magnetic material 148 or gaps. In one embodiment, the term "magnetic" means ferromagnetic or ferrimagnetic. In one embodiment, the term "non-magnetic" means paramagnetic, antiferromagnetic or diamagnetic, and also includes weakly magnetic materials.

The discrete magnetic elements 146 can be formed using any suitable technique. The shape of the magnetic elements can be oval (FIG. 2), circular, irregular, rectangular or any other desired shape. While the discrete magnetic elements 146 will generally be depicted as having a circular shape, it is understood that the elements 146 can take on other shapes. Additionally, the size of the depicted discrete magnetic elements 146 in the drawings is not to scale. The discrete magnetic elements 146 are represented in FIG. 3 and subsequent figures by the shaded portions, while the non-magnetic material 148 is generally represented by the non-shaded portions.

A discrete magnetic element 146 can be used, for example, to represent a single bit of data based on the magnetic polarity of the element. For example, a discrete magnetic element having a designated positive polarity can represent a logical zero while a magnetic element having a negative polarity, which is opposite the positive polarity, represents a logical 1. The particular orientation and direction of the domain of the magnetic elements that represents the positive or negative polarity, can be selected as desired based on the recording technique that is used. Additionally, in accordance with one embodiment, the magnetic fields generated by the magnetic elements have substantially the same magnitude.

One embodiment of the magnetic recording medium 140, shown in FIG. 3, comprises one or more data tracks or segments 150. Each of the data tracks 150 comprises an array of the magnetic elements 146. In one embodiment, the data tracks include a first row 152 of the discrete magnetic elements 146 and a second row 154 of the discrete magnetic elements 146. In one embodiment, the rows 152 and 154 extend in a lengthwise or track direction 156. In one example, the track direction 156 is perpendicular to a cross-track direction 160, as shown in FIG. 3.

Figure 4:
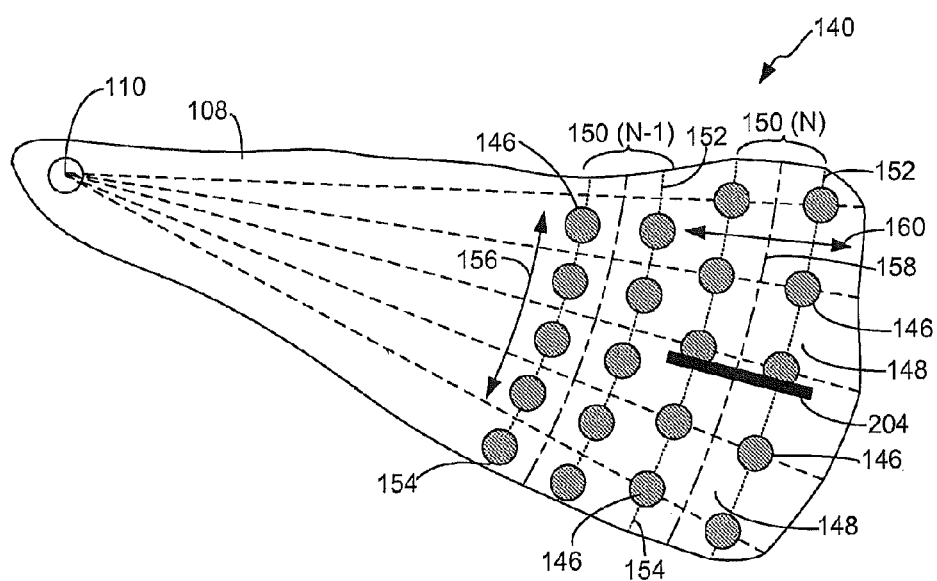
FIG. 4 is a partial top view illustrating a track of a magnetic recording medium in accordance with one or more embodiments of the invention.

A partial top plan view of the magnetic recording medium 140 in the form of a disc 108 is illustrated in FIG. 4. In accordance with this example, the data tracks 150 are generally concentric to the central axis 110. Thus, in this example, the track direction is generally aligned with the track path that is concentric to the axis 110. One embodiment of the cross-track direction 160 is generally aligned in the radial direction from the axis 110, as shown in FIG. 4.

In one embodiment, the adjoining rows 152 and 154 of the discrete magnetic elements 146 of each data track 150 each have positions along the track direction 156. In one embodiment, the positions of the elements 146 of the row 154 along the track direction 156 are substantially aligned with the corresponding positions of the elements 146 in the row 152, as shown in FIGS. 3 and 4. Each of the discrete magnetic elements 146 of the row 152 are substantially aligned in the cross-track direction 160 with one of the discrete magnetic elements of the row 154 of the same track 150.

In one exemplary embodiment, an element 146 or a position of the element 146 is "substantially aligned" with a corresponding element 146 in a given direction (e.g., cross-track direction), when a projection of the element 146 in the given direction overlaps at least 70% of the length of the corresponding element 146 measured in a direction (e.g., track direction) that is perpendicular to the given direction. For example, each element 146A in the row 154 is substantially aligned with a corresponding element 146B in the row 152 of the same track 150 in the cross-track direction 160, because a projection, in the cross-track direction 160, of the length $L_A$ of the element 146A measured in the track direction 156 overlaps at least 70% (100% in this example) of the length $L_B$, measured in the track direction 156, of the corresponding element 146B, as shown in FIG. 3.

In one embodiment, an element 146 is considered substantially aligned with a corresponding element 146 in a given direction (e.g., track or cross-track direction), when a projection of the element 146 in the given direction overlaps at least 80% of the length of the corresponding element 146 measured in a direction that is perpendicular to the given direction. In one embodiment, an element 146 is considered substantially aligned with a corresponding element 146 in a given direction (e.g., track or cross-track direction), when a projection of the element 146 in the given direction overlaps at least 90% of the length of the corresponding element 146 measured in a direction that is perpendicular to the given direction. In one embodiment, an element 146 is considered substantially aligned with a corresponding element 146 in a given direction (e.g., track or cross-track direction), when a projection of the element 146 in the given direction overlaps at least 95% of the length of the corresponding element 146 measured in a direction that is perpendicular to the given direction. In one embodiment, an element 146 is considered substantially aligned with a corresponding element 146 in a given direction (e.g., track or cross-track direction), when a projection of the element 146 in the given direction overlaps 100% of the length of the corresponding element 146 measured in a direction that is perpendicular to the given direction.

In one embodiment, the discrete magnetic elements 146 of a row, such as rows 152 and 154, are substantially aligned in the track direction 156.

In one embodiment, the discrete magnetic elements 146 of the rows 152 and 154 of a data track N have positions along the track direction 156 that are offset with corresponding positions of the discrete magnetic elements 146 of the rows 152 and 154 of the adjoining tracks N+1 and/or N−1, as shown in FIG. 3. In one exemplary embodiment, the term "offset" means not substantially aligned. Thus, for example, in one embodiment an element 146 or a position of the element 146 is offset with a corresponding element 146 in a given direction (e.g., track or cross-track direction), when a projection of the element 146 in the given direction overlaps less than 70% of the length of the corresponding element 146 measured in a direction (e.g., track direction) that is perpendicular to the given direction. For example, the element 146C in the row 154 of track N is offset from the corresponding or adjacent elements 146D in the row 152 of the adjoining track N+1, because a projection, in the cross-track direction 160, of the length $L_C$ of the element 146C measured in the track direction 156 does not overlap at least 70% of the length $L_D$, measured in the track direction 156, of the corresponding element 146D, as shown in FIG. 3. In the example of FIG. 4, the elements 146 of the rows 152 and 154 of the data track N have angular positions along the track direction 156 that are angularly offset with corresponding positions of the discrete magnetic elements 146 of the rows 152 and 154 of the adjoining track N−1.

The areal density of bit patterned media, such as medium 140, is expected to be high, which means that the size of the discrete magnetic elements 146 should be small. For example, the areal density of 1 terabit/in$^2$ requires the length and width dimension of the elements 146 to be approximately less than thirteen nanometers. In order to correctly position the read/write head 116 over such small magnetic elements 146, the servo system 134 should precisely measure the current position of the transducer(s) 127, particularly the cross-track position relative to the center 158 of the track 150 between the rows 152 and 154.

Figure 5:
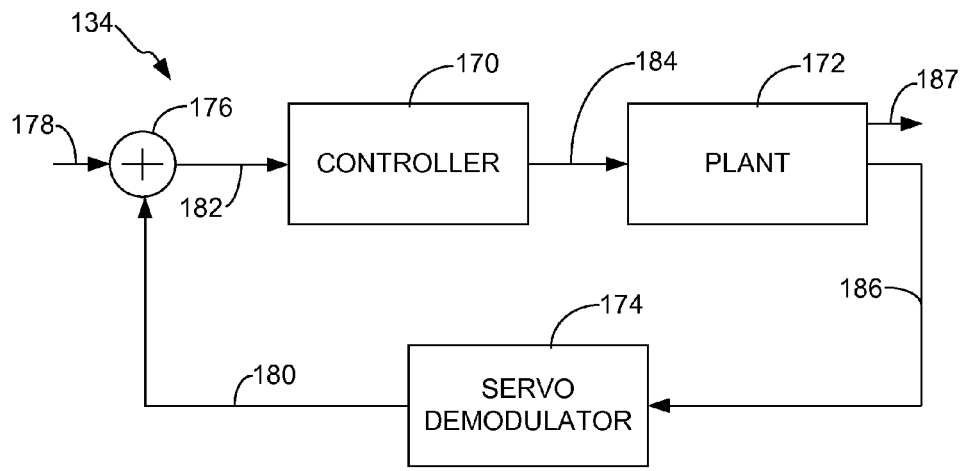
FIG. 5 is a block diagram of an exemplary servo system in accordance with one or more embodiments of the invention.

FIG. 5 is a block diagram of an exemplary servo system 134 in accordance with one or more embodiments of the invention. As mentioned above, the servo system 134 operates to control a position of a transducing read head, which may by carried by the slider 116 (FIG. 1), relative to one of the tracks 150 of the magnetic recording medium 140 using servo sector data stored in the tracks 150 of the media 140. The servo system 134 is arranged as a control loop that includes a controller 170, a plant 172, a servo demodulator 174, and a summing junction 176.

The summing junction 176 receives a reference position signal 178 and a position estimate output signal 180. The reference position signal 178 indicates a desired head position relative to the center of a track 150 that is being read by the read head transducer. The summing junction 176 calculates the difference between the desired and estimated signals 178 and 180 to provide an error output 182 that is representative of a desired adjustment of the position of the head slider 116.

The error output 182 is provided to the controller 170, which in turn produces a control output 184 for the plant 172. The plant 172 produces a control signal 187 in response to the control output 184 that directs the actuator 122 (FIG. 1) to move the slider 116 carrying the transducing head toward the desired position indicated by the signal 178.

The plant 172 represents the magnetic recording system whose servo sector output signal 186 is a readback signal with servo specific position information. The readback signal is produced in response to the sensing of servo sector data on the recording media 140, such as the disc 108, by the transducing read head 127 of the slider 116. As will be discussed below, embodiments of the servo sector include recorded position data for each track including one or more servo null or burst patterns that are used to generate a position error signal in the readback signal 186 that indicates a position of the head relative to a center 158 of the current data track 150. Accordingly, the readback signal 186 corresponding to the servo sector can be used to obtain current position data for the transducer(s) 127 of the head slider including a current track and a location of the transducer(s) 127 relative to a center 158 of the current track.

The readback signal 186 is provided to the servo demodulator 174, which includes circuitry that demodulates and decodes the position data to extract the position error signal and the current track position, which is provided in the position estimate output signal 180. When the desired position of the head indicated by the reference signal 178 is set to zero for track center, the difference between the position estimate signal 180 and the reference or desired position signal 178 will be the position error signal once the head is positioned over the desired track. However, the desired position of the head may be an offset value from the center of the track. As a result, once the head is positioned over the desired track, the error output 182 may consist of a difference between a desired position error signal representative of a desired position within the track, and the actual or estimated position error signal produced by the servo demodulator 174 that is representative of the current position of the head relative to a center of the track.

Figure 6:
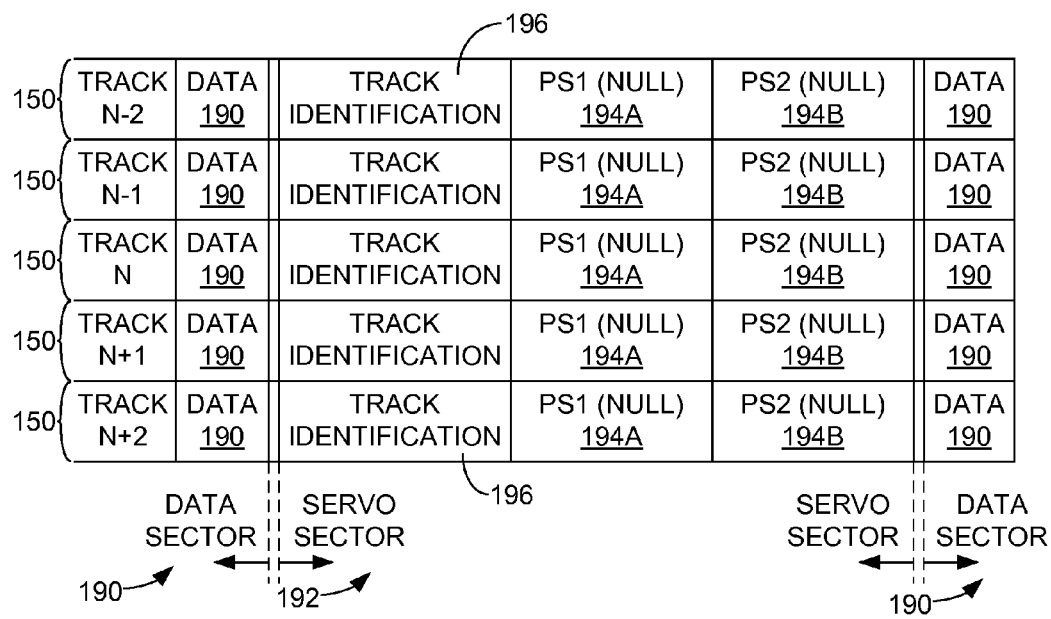
FIG. 6 is a simplified diagram illustrating portions of multiple tracks of a magnetic recording medium in accordance with one or more embodiments of the invention.

FIG. 6 is a simplified diagram illustrating portions of multiple data tracks 150 of the magnetic recording medium 140 in accordance with one or more embodiments of the invention. Each track 150 contains data sectors 190, in which the magnetic elements 146 represent bits of data based on their magnetic polarity. The bits of data can be written and read by the transducers 127 of the head 116 (FIG. 1). In one embodiment, the data tracks 150 comprise one or more servo sectors 192, which contain information used by the servo system 134 to control the position of the transducing head.

In one embodiment, the servo sector 192 includes one or more null patterns 194, such as a first null pattern 194A (PS1) and a second null pattern 194B (PS2). Additionally, the servo sector 192 can include a gray-coded track identification 196 that identifies the particular track 150 of the medium 140 that the head is positioned over. The servo sector 192 can include other information as well.

Figure 7:
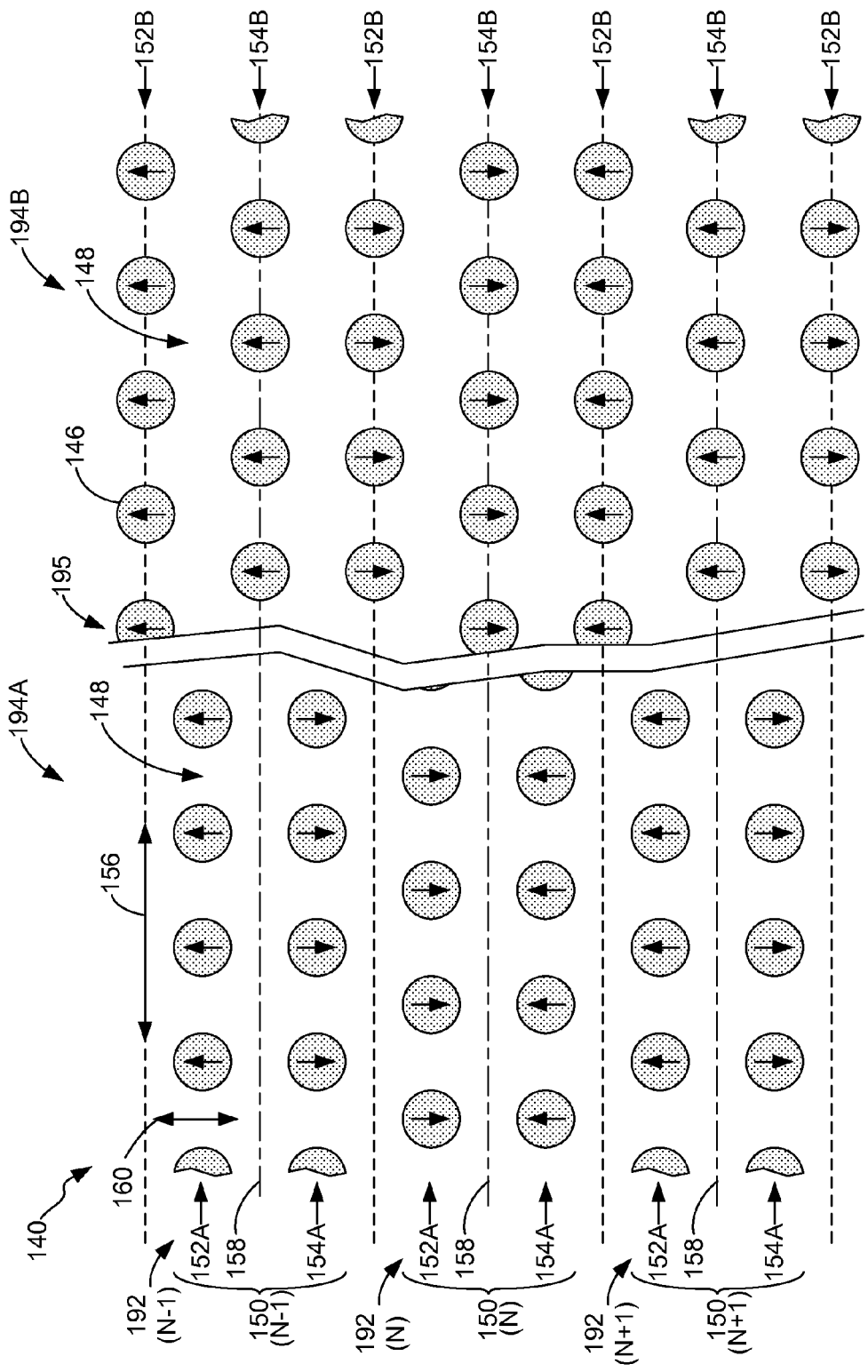
FIG. 7 is a simplified illustration of a portion of servo sectors of three consecutive tracks of a magnetic recording medium formed in accordance with one or more embodiments of the invention.

FIG. 7 is a simplified illustration of a portion of servo sectors 192 of three consecutive tracks 150 of the magnetic recording medium 140, in accordance with one or more embodiments of the invention. Track N−1 comprises servo sector 192 (N−1), which adjoins the servo sector 192 (N) of track N, which adjoins the servo sector 192 (N+1) of track N+1. Each of the servo sectors 192 comprise a plurality of the discrete magnetic elements 146 having a positive or negative polarity. In FIG. 7 and subsequent figures, the magnetic polarity of the magnetic elements 146 is indicated by the corresponding arrows pointing in either the upward direction or the downward direction relative to the page. For example, an arrow pointing in the upward direction can represent a positive polarity while an arrow pointing in the downward direction can represent a negative polarity. It should be understood that the actual magnetic field of the elements 146 could be oriented vertically or horizontally relative to the patterned recording layer 114 (FIG. 2).

In one embodiment, the servo sectors 192 include a first null pattern 194A that comprises rows 152A and 154A of the discrete magnetic elements 146. As discussed above, the rows 152A and 154A of the discrete magnetic elements 146 are substantially aligned in the track direction 156. In one embodiment, the magnetic polarity of the discrete magnetic elements 146 of the row 152A is opposite the magnetic polarity of the discrete magnetic elements 146 of the row 154A, which forms the null pattern 194A for each data track 150. In one embodiment, the discrete magnetic elements in the row 152A all have the same magnetic polarity. In one embodiment, the discrete magnetic elements 146 in the row 154A all have the same magnetic polarity. As mentioned above, in one embodiment, the discrete magnetic elements 146 of the row 152A are substantially aligned with the discrete magnetic elements 146 of the row 154A of the same track 150 (i.e., N, N−1 or N+1) in the cross-track direction 160, as illustrated in FIG. 7.

In accordance with one embodiment, the positions of the elements 146 along the track direction 156 of the servo sectors 192 of the null pattern 194A of a track 150 are offset with the positions along the track direction 156 of the corresponding elements 146 of the adjoining tracks 150, as shown in FIG. 7. That is, for instance, the projections of the magnetic elements 146 of the rows 152A and 154A of track 150(N) in the cross-track direction 160 are offset in the track direction 156 relative to the discrete magnetic elements 146 of the adjoining servo sector 192(N−1) of track 150(N−1) and the discrete magnetic elements 146 of the servo sector 192(N+1) of track 150(N+1), as illustrated in FIG. 7.

In one embodiment, the magnetic polarity of the discrete magnetic elements 146 of the row 152A matches the magnetic polarity of the discrete magnetic elements 146 of the adjoining row 154A of the adjoining servo sector 192. For instance, the magnetic polarity of the discrete magnetic elements 152A of the servo sector 192(N) matches the magnetic polarity of the discrete magnetic elements 146 of the row 154A of the adjoining servo sector 192(N−1), as shown in FIG. 7. Likewise, the magnetic polarity of the discrete magnetic elements 154A of the servo sector 192(N) matches the magnetic polarity of the discrete magnetic elements 146 of the row 152A of the adjoining servo sector 192(N+1), as shown in FIG. 7.

In one embodiment, the servo sectors 192 of each data track 150 comprises a second null pattern 194B that adjoins the first null pattern 194A on a down-track side 195 of the first null pattern 194A, as shown in FIG. 7. The term "down-track side of the first null pattern," as used herein, means in the track direction 156 from the first null pattern on a side that is downstream of the first null pattern as viewed by the transducer 127 during operation of the data storage medium. In one embodiment, the null pattern 194B comprises at least one row 154B of the discrete magnetic elements 146 that is located proximate to the center 158 of each track 150.

In one embodiment, the second null pattern 194B includes rows 152B and 154B of the discrete magnetic elements 146 that are offset in the cross-track direction 160 relative to the rows 152A and 154A of the null pattern 194A, as shown in FIG. 7. That is, for example, the projections of the magnetic elements 146 of the rows 152B and 154B in the track direction 156 are offset in the cross-track direction 160 relative to the positions of the discrete magnetic elements 146 of the rows 152A and 154A of the null pattern 194A along the cross-track direction 160, as illustrated in FIG. 7.

In one embodiment, the magnetic elements 146 of each row 152B of the null pattern 194B are offset in the cross-track direction 160 relative to the magnetic elements 146 of an adjoining row 154B of the null pattern 194B, as shown in FIG. 7. That is, for example, the magnetic elements 146 of the row 152B each have positions along the track direction 156 that are offset relative to the corresponding positions of an adjoining row 154B.

In one embodiment, the magnetic elements 146 of each row 152B of the null pattern 194B are substantially aligned in the cross-track direction 160 relative to the magnetic elements 146 of an adjoining row 154B of the null pattern 194B, as shown in FIG. 7. For example, each of the magnetic elements 146 have a position along the track direction 156 that is substantially aligned with a corresponding position of one of the discrete magnetic elements 146 of an adjoining row 152B.

In one embodiment, the discrete magnetic elements 146 of the row 152B of the null pattern 194B each have the same magnetic polarity. In one embodiment, the discrete magnetic elements 146 of the row 154B of the null pattern 194B each have the same magnetic polarity. In one embodiment, the magnetic polarity of the discrete magnetic elements 146 of the row 152B is opposite that of the discrete magnetic elements 146 of the adjoining row 154B that are substantially aligned in the cross-track direction 160 relative to the magnetic elements 146 of the row 152B. In one embodiment, the magnetic polarity of the discrete magnetic elements 146 of the row 152B is opposite that of the discrete magnetic elements 146 of the adjoining row 154B that are offset in the cross-track direction 160 relative to the magnetic elements 146 of the row 152B.

Figure 8:
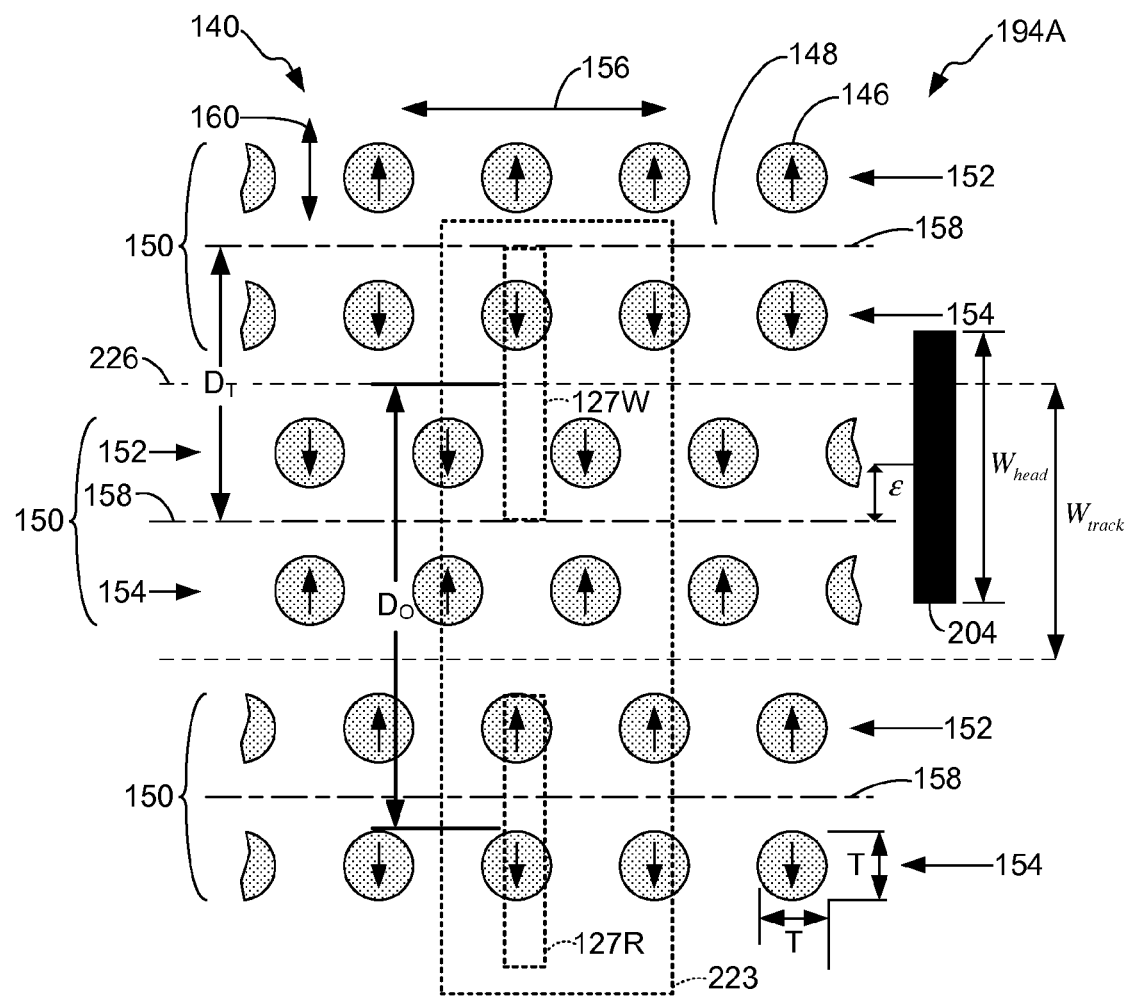
FIG. 8 is a simplified illustration of a read head positioned over a magnetic medium formed in accordance with one or more embodiments of the invention.

The slider 116 (FIG. 1) carries a read head and a write head, each of which include a transducer 127 respectively for reading the data bits represented by the magnetic polarity of the magnetic elements 146, and setting the magnetic polarity of the magnetic elements 146 to write the data bits. The read and write heads each carry a transducer 127 for performing the desired read or write operation. FIG. 8 is a simplified illustration of a read or read/write head 204 positioned over the medium 140 that includes the null pattern 194A described above.

The read head 204 travels over the recording medium 140 and generates the readback signal 186 in response to the sensing of the magnetic fields of the discrete magnetic elements 146 that are in close proximity to the head 204 (e.g., directly below the head). In FIG. 8, ε represents the position of the head 204 (e.g., center of the head) relative to the desired location (e.g., the center) within the track identified by the reference position signal 178 (FIG. 5), which here is the center 158 of the track N.

Coarse head position adjustments can initially be made to place the head 204 within the desired track N using the gray-coded track identifications 196 (FIG. 6). Following such a coarse head position adjustment, the observable range of the head position ε is generally limited to that provided in Equation 1.

$$\varepsilon \in [-0.5 W_{track}, 0.5 W_{track}] \qquad \text{Eq. 1}$$

For the given ε range in Eq. 1, the readback signal of the null pattern 194 in Track N is $$y(k) = \frac{\alpha_1(\varepsilon)}{T} y_1(k) + \frac{\alpha_2(\varepsilon)}{T} y_2(k) \qquad \text{Eq. 2}$$

where $y_1(k)$ and $y_2(k)$ represent the readback signal respectively generated by the first row 152 and the second row 154 of the desired track N at column k (explained below), and $\alpha_1(\varepsilon)$ and $\alpha_2(\varepsilon)$ are the portions of the width of the head ($W_{head}$) that overlap the first row 152 and the second row 154 of track N, respectively. T represents the size of the magnetic elements 146. k represents the column of the servo sector over which the transducer 127 is positioned. The column k corresponds to the stacked pairs of the magnetic elements 146 in rows 152 and 154 of the servo sector 192.

Because of the stacked formation of the magnetic elements 146 in the rows 152 and 154 of the null pattern 194A, $\{y_1(k)\}$ and $\{y_2(k)\}$ result in a substantially time invariant readback signal 186 as the head 204 passes over the null pattern 194A and when the head 204 is within a given track 150 and when the read signal 186 is properly sampled. When the head 204 is centered within a given track 150 (i.e., ε=0), the readback signal 186 is that is generated by the head 204 is zero as it passes over the null pattern 194A moving from the first pair (i.e., first column k=1) of the magnetic elements 146 of the rows 152 and 154 to the last pair (i.e., last column k=i) of the magnetic elements 146. When the position of the head 204 overlaps adjoining tracks 150, the readback signal 186 that is generated as the head 204 passes over the null pattern 194A is generally time variant due to the staggered magnetic elements 146 of the adjoining rows 152 and 154.

Figure 9:
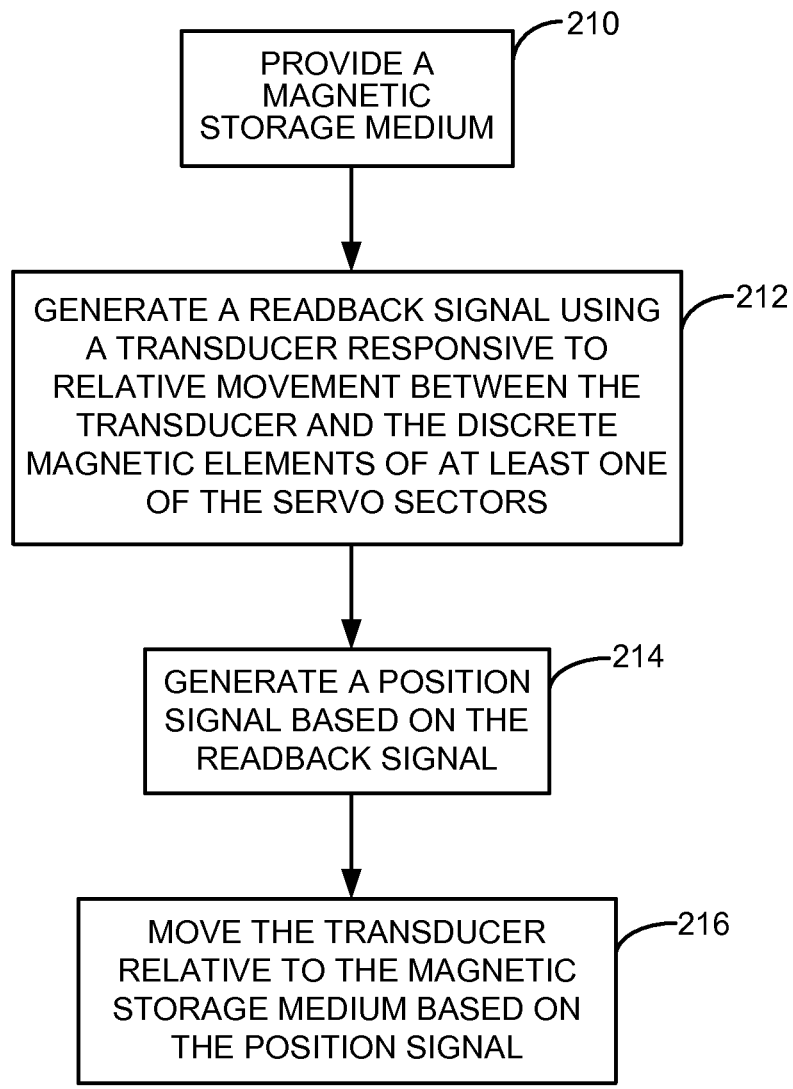
FIG. 9 is a flowchart illustrating a method of demodulating a readback signal in accordance with one or more embodiments of the invention.

FIG. 9 is a flowchart illustrating a method of using the null pattern of the medium 140 to adjust the position of the read head 204 relative to the medium, in accordance with one or more embodiments of the invention. In one embodiment of the method, a magnetic storage medium 140, which is formed in accordance with one or more embodiments of the invention described above, is provided at step 210. In one embodiment, the magnetic storage medium 140 comprises a plurality of discrete magnetic elements 146 and adjoining servo sectors, such as 192 (N) and 192 (N−1) (FIGS. 4 and 7). In one example, each of the servo sectors 192 include a row 152 of the discrete magnetic elements extending in a track direction 156 and a row 154 of the discrete magnetic elements 154, which are substantially aligned with the discrete magnetic elements 146 of the row 152 in a cross-track direction 160. In one example, the discrete magnetic elements 146 of the servo sector 192 (N) are offset in the cross-track direction 160 relative to the discrete magnetic elements 146 of the servo sector 192 (N−1).

At step 212, a readback signal 186 is generated using the transducer 127 responsive to relative movement between the transducer and the magnetic elements 146 of at least one of the servo sectors 192 (N) and 192 (N−1). When the medium 140 is in the limn of a disc 108, the disc 108 rotates relative to the slider 116 causing the relative movement between the magnetic elements 146 of the servo sectors 192 and the transducer 127.

At step 214, a demodulated position signal (180) corresponding to the position of the head 204 relative to the target track 150 is generated based on the readback signal samples. In one embodiment of step 214, the demodulated position signal is generated based on a summation of the readback signal samples 213.

At step 216, the transducer 127 is moved relative to the magnetic storage medium 140 based on the position signal 180. For the magnetic storage device in the form of the disc drive 100 (FIG. 1), the transducer 127 is moved along the arc 128 responsive to the position signal 180 to place the read or write transducer 127 over the desired track 150. The desired read or write operation within the track 150 can then begin on the data sectors 190 of the track 150.

In one embodiment of the method, the magnetic recording medium 140 includes both the null pattern 194A and the null pattern 194B described above with reference to FIG. 7. In one embodiment, step 212 comprises generating the readback signal samples 213 corresponding to the discrete magnetic elements 146 of the null pattern 194A, adjusting the readback signal samples by multiplying the readback signal samples by a digital reference and summing the adjusted readback signal samples to form the sum A. The digital reference waveform is defined as −1k (where k=1 to n and n is the maximum number of samples of the null pattern 194A) when we have only one sample per element 146. For higher sample rates the digital waveform will be accordingly defined as an alternating series of m/2 (1)'s and m/2 (−1)'s, where m is the number of samples per every element period. Additionally, the step 212 comprises generating the readback signal samples corresponding to the discrete magnetic elements 146 of the null pattern 194B, adjusting the readback signal samples by multiplying the readback signal samples by a digital reference and summing the adjusted readback signal samples to form the sum B. At step 214, the demodulated position signal is generated based on the sums A and B. When the sum A is zero, it is known that the transducer 127 is positioned in the center 158 of the track 150. However, when the sum A is non-zero and the transducer is not positioned in the center 158 of the track 150. The sum A and B is used to determine the magnitude of the distance and the direction on which the transducer 127 is located.

Figure 10:
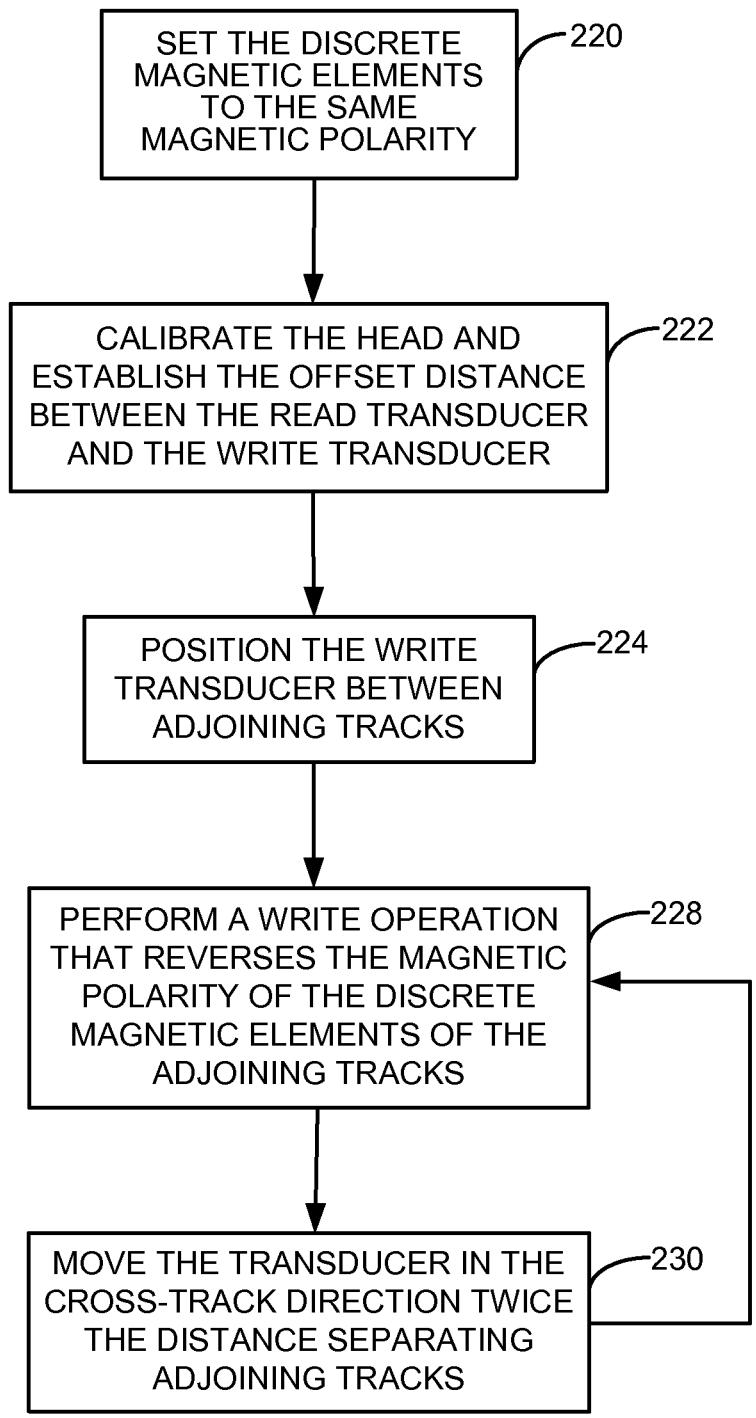
FIG. 10 is a flowchart illustrating a method of forming a null pattern in accordance with one or more embodiments of the invention.

Another embodiment of the invention is directed to a method of forming the null pattern 194A on the medium 140, which will be described with reference to FIG. 8 and the flowchart of FIG. 10. At 220 of the method, the discrete magnetic elements 146 of the medium 140 are each set to the same magnetic polarity, as indicated at 220. In one embodiment, this is accomplished by applying a magnetic field to the medium 140 that aligns the magnetic domains of the elements 146 in the same direction. Although not illustrated in FIG. 8, at this stage, the magnetic polarity arrows of each of the elements 146 would point in the same direction.

Next, at 222, the read/write head 223 carried by the slider 116 (FIG. 1) is calibrated using the medium 140 in accordance with conventional techniques. This calibration of the head 223 includes writing test patterns to the elements 146, which are used to determine the offset distance $D_O$ in the cross-track direction 160 between the read transducer 127R and the write transducer 127W of the head 223, which are shown in phantom. The offset distance $D_O$, which typically spans multiple tracks 150, is not shown to scale in FIG. 8. The offset distance $D_O$ is used to establish a location of the write transducer 127W from the location of the read transducer 127R, which is determined through the reading of the magnetic elements 146.

At 224, the write transducer 127W is positioned between two adjoining tracks 150, such as the location represented by line 226, using the location of the read transducer 127R and the offset distance $D_O$. At 228, a write operation commences that reverse the polarity of the magnetic elements 146 in the rows 154 and 152 that adjoin the location 226 of the write transducer 127W. At 230, the location of the write transducer 127 is moved in the cross-track direction 160 a distance equal to twice the distance $D_T$ separating adjoining tracks 150. Steps 228 and 230 are then repeated until the pattern 194A is formed on the medium 140.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A magnetic storage medium comprising:
    first and second adjoining tracks, each track including:
        a first row of discrete magnetic elements extending in a track direction; and
        a second row of discrete magnetic elements extending in the track direction, which have positions along the track direction that are substantially aligned with corresponding positions of the discrete magnetic elements of the first row;
    wherein the discrete magnetic elements of the first track have positions along the track direction that are offset with corresponding positions of the discrete magnetic elements of the second track;
    wherein a magnetic polarity of the discrete magnetic elements of the first row of the first track is opposite a magnetic polarity of the discrete magnetic elements of the second row of the first track.

2. The magnetic storage medium of claim 1, wherein the magnetic polarity of the discrete magnetic elements of the second row of the first track matches a magnetic polarity of the discrete magnetic elements of the first row of the second track.

3. The magnetic storage medium of claim 1, further comprising a servo sector including:
a first null pattern comprising the first and second rows of discrete magnetic elements; and
a second null pattern adjoining the first null pattern on a down-track side of the first null pattern, the second null pattern comprising a first row of discrete magnetic elements having a position along a cross-track direction that is offset with the corresponding positions of the first and second rows of the first null pattern.

4. The magnetic storage medium of claim 1, further comprising a servo sector including:
a first null pattern comprising the first and second rows of discrete magnetic elements; and
a second null pattern adjoining the first null pattern on a down-track side of the first null pattern, the second null pattern comprising:
a first row of discrete magnetic elements; and
a second row of discrete magnetic elements each having a position along the track direction that is substantially aligned with a corresponding position of one of the discrete magnetic elements of the first row of the second null pattern.

5. The magnetic storage medium of claim 4, wherein a magnetic polarity of the discrete magnetic elements of the first row of the second null pattern is opposite a magnetic polarity of the discrete magnetic elements of the second row of the second null pattern.

6. The magnetic storage medium of claim 1, wherein the magnetic polarity of the discrete magnetic elements of the first row of the first track is the same.

7. The magnetic storage medium of claim 1, wherein the first track is part of a first servo sector and the second track is part of a second servo sector.

8. A magnetic storage device comprising:
a spindle motor;
a magnetic storage medium rotatably mounted to the spindle motor, the magnetic storage medium comprising:
first and second adjoining tracks, each track including:
a first row of discrete magnetic elements extending in a track direction; and
a second row of discrete magnetic elements extending in the track direction, which have positions along the track direction that are substantially aligned with corresponding positions of the discrete magnetic elements of the first row;
wherein the discrete magnetic elements of the first track have positions along the track direction that are offset with corresponding positions of the discrete magnetic elements of the second track,
wherein a magnetic polarity of the discrete magnetic elements of the first row of the first track is opposite a magnetic polarity of the discrete magnetic elements of the second row of the first track;
a transducer positioned adjacent the discrete magnetic elements, the transducer generates a readback signal responsive to relative movement of the transducer and the track; and
a servo system configured to adjust a position of the transducer relative to the magnetic storage medium responsive to the readback signal.

9. The magnetic storage device of claim 8, wherein the magnetic polarity of the discrete magnetic elements of the second row of the first track matches a magnetic polarity of the discrete magnetic elements of the first row of the second track.

10. The magnetic storage device of claim 8, further comprising a servo sector including:
a first null pattern comprising the first and second rows of discrete magnetic elements; and
a second null pattern adjoining the first null pattern on a down-track side of the first null pattern, the second null pattern comprising a first row of discrete magnetic elements having a position along a cross-track direction that is offset with the corresponding positions of the first and second rows of the first null pattern.

11. The magnetic storage device of claim 8, further comprising a servo sector including:
a first null pattern comprising the first and second rows of discrete magnetic elements; and
a second null pattern adjoining the first null pattern on a down-track side of the first null pattern, the second null pattern comprising:
a first row of discrete magnetic elements; and
a second row of discrete magnetic elements each having a position along the track direction that is substantially aligned with a corresponding position of one of the discrete magnetic elements of the first row of the second null pattern.

12. The magnetic storage device of claim 11, wherein a magnetic polarity of the discrete magnetic elements of the first row of the second null pattern is opposite a magnetic polarity of the discrete magnetic elements of the second row of the second null pattern.

13. A method comprising:
providing a magnetic storage medium comprising:
first and second adjoining tracks, each track including:
a first row of discrete magnetic elements extending in a track direction; and
a second row of discrete magnetic elements extending in the track direction, which have positions along the track direction that are substantially aligned with corresponding positions of the discrete magnetic elements of the first row;
wherein the discrete magnetic elements of the first track have positions along the track direction that are offset with corresponding positions of the discrete magnetic elements of the second track,
wherein a magnetic polarity of the discrete magnetic elements of the first row of the first track is opposite a magnetic polarity of the discrete magnetic elements of the second row of the first track;
generating a readback signal using a transducer responsive to relative movement between the transducer and the discrete magnetic elements of at least one of the tracks;
generating a position signal based on the readback signal; and
moving the transducer relative to the magnetic storage medium in response to the position signal.

* * * * *